(12) United States Patent
Omersa

(10) Patent No.: US 8,546,041 B2
(45) Date of Patent: Oct. 1, 2013

(54) FUEL CELL ELEMENTS

(75) Inventor: Kenneth Edward Anthony Omersa, Hertfordshire (GB)

(73) Assignee: Omnagen Limited, Hertfordshire (GB)

( * ) Notice: Subject to any disclaimer, the term of this patent is extended or adjusted under 35 U.S.C. 154(b) by 1058 days.

(21) Appl. No.: 12/526,511

(22) PCT Filed: Feb. 21, 2008

(86) PCT No.: PCT/GB2008/050117
§ 371 (c)(1),
(2), (4) Date: Sep. 8, 2009

(87) PCT Pub. No.: WO2008/102178
PCT Pub. Date: Aug. 28, 2008

(65) Prior Publication Data
US 2010/0086822 A1    Apr. 8, 2010

(30) Foreign Application Priority Data
Feb. 23, 2007 (GB) .................................. 0703550.4

(51) Int. Cl.
*H01M 2/20* (2006.01)
*H01M 8/24* (2006.01)
*H01M 2/38* (2006.01)
*H01M 2/40* (2006.01)
*H01M 8/10* (2006.01)
*H01M 2/08* (2006.01)
*H01M 2/14* (2006.01)

(52) U.S. Cl.
USPC ........... 429/469; 429/460; 429/465; 429/471; 429/481; 429/509

(58) Field of Classification Search
USPC .................. 429/469, 465, 471, 460, 481, 509
See application file for complete search history.

(56) References Cited

U.S. PATENT DOCUMENTS 5,486,428 A * 1/1996 Gardner et al. ............... 429/410
6,645,656 B1  11/2003 Chen
(Continued)

FOREIGN PATENT DOCUMENTS

FR   2846797   5/2004
GB   2400723   4/2003
(Continued)

OTHER PUBLICATIONS

Beckel et al: "Thin films for micro solid oxide fuel cells" Journal of Power Sources, Elsevier, Amsterdam NL, vol. 173, No. 1, Oct. 3, 2007.

(Continued)

*Primary Examiner* — Patrick Ryan
*Assistant Examiner* — Julian Anthony
(74) *Attorney, Agent, or Firm* — Egbert Law Offices, PLLC

(57) ABSTRACT

There is provided a fuel cell element including a substrate and one or more fuel cells thereon, the one or more fuel cells not entirely covering the substrate. The one or more fuel cells each include a solid state, non-polymeric first electrode layer, a solid state, non-polymeric second electrode layer, and a solid state, non-polymeric electrolyte layer between the first and second electrode layers. The substrate includes one or more porous regions, or being entirely porous, the one or more fuel cells each being supported by one or more porous regions of the substrate. At least one, or part of one, of the porous regions of the substrate are not sealed by electrolyte. Arrays of fuel cell elements of the invention are also provided, as are stacks of fuel cell elements or arrays of the invention.

15 Claims, 5 Drawing Sheets

(56) References Cited

U.S. PATENT DOCUMENTS

| | | | |
|---|---|---|---|
| 7,465,506 B2 * | 12/2008 | Faye et al. | 429/410 |
| 2002/0048699 A1 | 4/2002 | Steele et al. | |
| 2004/0048128 A1 | 3/2004 | Jankowksi et al. | |
| 2004/0197628 A1 | 10/2004 | Yoshikata | |

FOREIGN PATENT DOCUMENTS

| | | |
|---|---|---|
| GB | 2400723 | 10/2004 |
| GB | 2420440 | 11/2004 |
| GB | 2420440 | 5/2006 |
| GB | 2422479 | 7/2006 |
| JP | 2005174663 | 6/2005 |
| WO | 02101859 | 12/2002 |
| WO | WO 02 101859 | 12/2002 |
| WO | 2007024917 | 3/2007 |
| WO | WO 2007 024907 | 3/2007 |

OTHER PUBLICATIONS

Beckel et al. "Thin films for micro solid oxide fuel cells" Journal of Power Sources, Elsevier, Amsterdam, NL, Oct. 3, 2007, pp. 325-345, vol. 173 No. 1.

* cited by examiner

FUEL CELL ELEMENTS

This invention relates to substrate supported fuel cells for use in an environment where both fuel and oxidant fluids are supplied to both electrodes of each fuel cell. Each fuel cell comprises a first electrode and a second electrode on opposing faces of an electrolyte layer. It applies to non-polymeric solid state fuel cells such as solid oxide fuel cells (SOFC) and protonic ceramic fuel cells (PCFC).

BACKGROUND OF THE INVENTION

A fuel cell allows the electrochemical reaction of a fuel (e.g. hydrogen) with an oxidant (e.g. air), producing electricity, heat and exhaust products. In conventional fuel cells the fuel and oxidant are not allowed to mix—a so called 'dual-chamber' process. The cell consists of an electrolyte which is impermeable to the fuel and oxidant, but which selectively allows ions to pass through, with electrodes on opposing faces. In this case the fuel is supplied to one electrode—the anode—where it is oxidised, and the oxidant to the other electrode—the cathode—where it is reduced. This generates a voltage, and the electrodes are connected to an external circuit.

There are different types of fuel cell which are characterised by the electrolyte. The present invention is particularly suitable for use with a solid oxide fuel cell (SOFC), where the electrolyte is a solid state ceramic which conducts oxygen ions, but it may also be used with fuel cell with a solid state proton conducting electrolyte, known as a protonic ceramic fuel cell (PCFC). An advantage of a SOFC is that it can oxidise hydrocarbons directly.

Each fuel cell generates a low voltage of a few hundred millivolts, and a power density of typically less than one watt/sq·cm. In most applications this is insufficient, and cells are therefore often connected in series and/or parallel in order to generate the required output.

Two major objectives of fuel cell development are to minimise cost, and to establish long term durability. Cost reduction can be achieved by reducing the complexity of the ancillary equipment, lowering the operating temperature, reducing production costs, and using inexpensive materials. Long term durability is achieved by using robust materials which are stable in the process conditions.

A solid oxide fuel cell consists of three ceramic layers—cathode/electrolyte/anode. High temperature cells are typically made by conventional ceramic techniques such as tape casting and screen printing, and the most common electrolyte material is yttria stabilised zirconia (YSZ). This produces fairly thick electrolyte layers of many tens of microns, or even hundreds of microns. In order to reduce the operating temperature to below 600° C., the electrolyte needs to be changed, for example to a doped ceria such as ceria gadolinia (CGO), and the thickness needs to be reduced to 20 microns or less. In such thin film solid oxide fuel cells (TFSOFC), the electrodes will also tend to be quite thin, the result being that the ceramic layers are not able to support themselves, and need to be physically supported for example by silicon (see, for example, US2004043273), or ferritic stainless steel (as disclosed in U.S. Pat. No. 6,794,075).

The present invention relates to fuel cells that are suitable for use in a process whereby both fuel and oxidant are supplied to both electrodes of each fuel cell. In this case the catalyst in the anode is chosen to primarily oxidise the fuel, and the catalyst in the cathode to primarily reduce the oxidant. From now on this will be referred to as a 'single-chamber' process.

In the conventional 'dual-chamber' process, essentially planar fuel cell layers are stacked with alternating bipolar plates, which provide an electrical connection and a barrier between reacting gases. Seals are also required. This allows the fuel cell layers to be connected in series, and the required voltage to be generated.

The single-chamber process has several major advantages over the 'dual-chamber' process:—
1. Substrates supporting fuel cells can be stacked directly on top of each other. Bipolar plates and seals are not required. This results in a stack which is not only simple to assemble, but also can achieve a high power density because the separation between each layer can be very small.
2. As fuel and oxidant are present on both sides of each fuel cell, mechanical failure of a fuel cell has a minimal effect on the performance of the stack, which enhances the long term durability.
3. Joining is not essential, so non-metallic substrates can be used.
4. Ducting is much simpler, and therefore less costly than with dual chamber processes.

The main problems with single-chamber processes are:—
1. The mixture of fuel and oxidant can be explosive.
2. Fuel utilisation is lower than with the dual chamber process.
3. Efficiency is lower because of direct reactions between fuel and oxidant.
4. Fluid flow can be difficult because of the absence of fluid flow plates between the fuel cells.

Substrate supported fuel cells mitigate a number of these problems. Their thin electrolyte layers allow operation at lower temperatures than traditional all ceramic fuel cells. This reduces parasitic reaction rates between fuel and oxidant.

Substrates can be shaped with fluid flow passages, and can have porous regions outside the areas covered by fuel cells. This allows fluids to access the fuel cell electrodes.

Substrates can make electrical contact with adjacent fuel cell elements, hence simplifying construction of the stack.

Good thermal conductivity of metallic substrates helps to equalise temperatures across the layer. This can be a particular problem with ceramic-only fuel cells, where thermal gradients across a layer can cause failure.

Fuel cells on substrates which are not electrically conducting may be connected in series and/or parallel. Such substrates may then be connected to adjacent substrates if required.

In substrate supported fuel cells the active layers are very thin. Should individual fuel cells rupture, then there will be a minimal effect on the performance of the stack because the fluids on each side of the substrate will be very similar.

In conventional 'dual-chamber' substrate supported fuel cells (e.g. as disclosed in GB 2420440A) the electrolyte has to seal any porous regions to prevent mixing of the fuel and oxidant. This is not the case in a single-chamber process where both fuel and oxidant are present on both sides of the fuel cell. Therefore the substrate may have porous regions around the fuel cells, or indeed be entirely porous.

The present invention provides a fuel cell element comprising a substrate and one or more fuel cells thereon, the one or more fuel cells not entirely covering the substrate, the one or more fuel cells each comprising a solid state, non-polymeric first electrode layer, a solid state, non-polymeric second electrode layer, and a solid state, non-polymeric electrolyte layer between the first and second electrode layers, the substrate comprising one or more porous regions, or being entirely porous, the one or more fuel cells each being supported by one or more porous regions of the substrate, and at least one, or part of one, of the porous regions of the substrate not being sealed by electrolyte.

Because the substrates of fuel cell elements of the present invention are not entirely sealed by electrolyte, the fuel cell elements have particular advantages when used in a single chamber process, including better penetration of fuel and oxidant into a stack of fuel cell elements. In addition manufacture is less demanding and less expensive, as there is no need to seal a dense electrolyte to the substrate. This also allows a wider range of substrate materials to be used, as a close match of thermal expansion coefficients between the substrate and the electrolyte is no longer essential.

In fuel cell elements of the present invention the substrate may not be entirely sealed by electrolyte because the electrolyte layer is itself porous and/or because the electrolyte layer is separated from the substrate by a porous electrode layer and/or because the fuel cell element comprises at least one porous region which is partially, or entirely, free of fuel cells (optionally, the entire substrate may be porous). Of course any of these features may be present in any combination in fuel cell elements of the present invention.

Preferably in fuel cell elements according to the present invention the substrate is shaped to form one or more gas or liquid flow pathways.

In fuel cell elements according to the present invention comprising two or more fuel cells and in which the substrate is non-electrically conducting, the two or more fuel cells may optionally be connected by deposited electrically conducting materials.

Fuel cell elements according to the present invention wherein the substrate is metallic may further comprise insulating ceramic deposits.

In fuel cell elements according to the present invention comprising two or more fuel cells, one or more of the composition, thickness and/or porosity of one or both of the first and second electrode layers of at least one fuel cell may differ from the composition, thickness and/or porosity of the corresponding first and/or second electrode layer of at least one other fuel cell. Similarly, one or more of the composition, thickness and/or porosity of the electrolyte layer of at least one fuel cell may differ from the composition, thickness and/or porosity of the electrolyte layer of at least one other fuel cell.

Fuel cell elements according to the present invention may comprise a substrate having a planar portion on which the, or each, fuel cell is located and an edge portion which lies partially or wholly outside the plane of the planar portion.

Fuel cell elements according to the present invention may comprise a substrate which is tubular; the tubular substrate either being open at both ends, sealed at one end or sealed at both ends.

Fuel cell elements according to the present invention may be arranged as arrays of fuel cell elements, preferably horizontal arrays; the fuel cell element in the array being joined at the edges of their substrates, the substrates being electrically insulated from each other, or electrically connected to each other.

Fuel cell elements according to the present invention may be arranged in stacks of two or more fuel cell elements in order to generate increased potential and current therefrom. The fuel cells in each stack may be connected electrically in series or in parallel. Arrays of fuel cell elements according to the present invention may also be used to form stacks. In stacks according to the present invention each element or array is adjacent to one or two elements or arrays, stacked in directions substantially normal to the plane or planes of the element or array.

In stacks of two or more fuel cell elements or two or more arrays of fuel cell elements according to the present invention one or more of the composition, thickness and/or porosity of one or more of the first and second electrode layers of at least one fuel cell of at least one fuel cell element or array may differ from the composition, thickness and/or porosity of one or more of the corresponding first and second electrode layers of at least one fuel cell of at least one other fuel cell element or array. Similarly, one or more of the composition, thickness and/or porosity of the electrolyte layer of at least one fuel cell of at least one fuel cell element or array may differ from the composition, thickness and/or porosity of the electrolyte layer of at least one fuel cell of at least one other fuel cell element or array.

In stacks of two or more fuel cell elements or two or more arrays of fuel cell elements of the present invention, one or more of the composition, thickness and/or porosity of the substrate of at least one fuel cell element or array may differ from the composition, thickness and/or porosity of the substrate of one or more other fuel cell elements or arrays.

The main requirements for the substrate for use in fuel cell elements of the present invention are:—
1. To provide physical support to the fuel cells.
2. To allow the production of pores and/or fluid flow channels.
3. To provide conduction of electrons either because the substrate is an electrical conductor, or because conduction channels are deposited on electrically insulating substrate.
4. To be stable in the process conditions.
5. Not to catalyze the direct reaction between the fuel and oxidant.

The basic building block of a fuel cell stack is the fuel cell element. Fuel cell elements of the present invention comprise a substrate which is either entirely or partially porous. The substrate may consist of a porous region or regions either entirely or partially surrounded by a non-porous region or regions; or of a non-porous region or regions either partially or entirely surrounded by a porous region or regions. Each substrate may support one or more fuel cells. The fuel cells each comprise three ceramic layers—electrode/electrolyte/electrode, and are deposited onto porous regions of the substrate. In fuel cells for use in a dual chamber process the electrolyte must be dense to prevent mixing of the fuel and oxidant. In fuel cell elements of the present invention (which are particularly useful in a single chamber process) the electrolyte can itself be porous, so that even if it directly covers all the pores it allows fluids to pass from one side of the substrate to the other.

The supply of fluid reactants to the fuel cells, and the removal of reaction products are vital to the efficient operation of a fuel cell stack. This not only involves the channeling of fluids, but also the provision of turbulent flow. In a single-chamber process this can be achieved by incorporating channels in the substrate, by porosity, or both. Successive layers may have different shapes and/or porosity.

Fluids may enter the fuel cell stack within the same plane as the fuel cell elements, from above or below, or at any other angle. Fuel and oxidant may be mixed before entering the stack, or enter the stack separately. The position of the exhaust would be dictated by the shaping and porosity of the substrates, as well as the entry point(s) for the fluid or fluids.

Any solid material is a potential substrate for fuel cell elements according to the present invention, depending on the process conditions. In practice the main candidates are metals, carbon/graphite, silicon and ceramics.

Metal substrates may be planar, or shaped before or after one or more of the ceramic layers are deposited. The porosity can be created before or after the ceramic layers have been applied. Techniques such as photochemical etching, mechanical or laser drilling can be used to provide pores of a suitable size and distribution. Alternatively a woven metal mesh, or expanded metal, may be used as the starting substrate. Powder metallurgical routes may also be used. It is advantageous in some designs to vary the size and density of the pores along the length of the substrate, and through the stack, to compensate for the lower level of fuel available as it is consumed, and also to allow better fluid flow through unoccupied regions of the substrate. It may also be advantageous to have multiple porous regions associated with individual fuel cells.

Metals are intrinsically tough and durable, which enhances the long term durability of the cell. The metal substrate may be made of any material which is capable of dealing with the high temperature environment. Potential materials are—iron, stainless steels, nickel, nickel alloys, cobalt, cobalt alloys, titanium, titanium alloys. Other possibilities are tungsten, tantalum, zirconium, molybdenum, chromium, silver, copper, gold, platinum, palladium, lanthanum, strontium, or alloys or mixtures thereof. The metal substrate may be coated on one or both sides to improve corrosion resistance, and/or to reduce contact resistance. It may also be treated or coated to effect its catalytic performance—mainly to minimise direct reaction between fuel and oxidant.

The metal substrate may be continuous, or parts may be produced separately, and joined afterwards by suitable techniques such as the full range of welding techniques, brazing, diffusion bonding, soldering, bolting and riveting. The edges of parts to be joined may be butted onto each other, overlapped or flanged.

Shaping of the substrate may take the form of channels, grooves or indentations. In single-chamber fuel cells, conduits may be formed between adjacent substrates.

The metal substrate may consist of foil or sheet, and forming may be achieved by various techniques known in the art, such as die pressing or super plastic forming. The forming may be carried out at any stage during the manufacture of the substrate, depending on which method of deposition and pore forming is used.

The same shape of metallic substrate may be manufactured out of thicker material, which is then machined or etched into the required shape, before or after the fuel cells are deposited. Depending on the metal involved, the substrate could be cast by techniques such as investment casting or die-casting, either to the final shape, or to a shape which could be machined or etched to the final shape. Alternatively, powder metallurgical routes may be used.

For metal substrates made from foil, the thickness may be from 25 µm to 250 µm, preferably from 40 µm to 150 µm, for example 75 µm. For metal substrates made from sintered metal powder, the thickness range may be from 200 µm to 1000 µm.

For metal substrates the lateral pore size for regions supporting fuel cells may be from 2 µm to 300 µm, preferably 15 µm to 80 µm, for example 40 µm. For regions not supporting fuel cells the lateral pore size may be the same or larger, with a maximum size of 50 mm.

The other substrates listed below are not easy to join, but that is not essential for single-chamber operation.

Carbon/graphite is a potential substrate material for fuel cell elements of the present invention. A great deal of work has been done in producing porous graphite including fluid flow channels for use in PEM (Proton Exchange Membrane) and DMFC (Direct Methanol Fuel Cells) cells. This would provide support, fluid supply, and electron conduction.

Silicon has already been used as a substrate in SOFCs. As a result of the high quality surface finish, thin layers, and the precise etching available with semiconductor techniques, it is possible to produce and support very thin electrolyte layers. This will provide a low operating temperature which is beneficial to the single-chamber process. Fluid flow channels can be etched. Electrical conduction channels can be deposited on the silicon to connect fuel cells.

Some ceramics, such as alumina, zirconia, silica, silicon carbide and mullite, are readily available in porous form, and in different shapes. Other ceramics can be machined and etched. Although these are susceptible to varying degrees to thermal shock, they will not contaminate the other ceramic layers that they support. Also most ceramics are stable in the process conditions, and do not encourage direct reaction between the fuel and oxidant. Electrical conduction channels can be deposited on the ceramic to connect fuel cells.

Ceramic substrates may have thicknesses of from 100 µm to 10 mm, preferably 500 µm to 5 mm, for example 2 mm.

For ceramic substrates the lateral pore size for regions supporting fuel cells may be from 20 nm to 250 µm, preferably 5 µm to 80 µm, for example 20 µm. For regions not supporting fuel cells the lateral pore size may be the same or larger, with a maximum of 500 µm.

Electrically insulating substrates can also be produced by coating or treating metals; for example, anodising stainless steel.

In the case of electrically conducting substrates such as metals and graphite, where one electrode of each fuel cell is in contact with the metal, then each fuel cell is connected in parallel. Fuel cell elements may preferably be stacked in order to accumulate the required voltage.

If the substrate is electrically insulating, as is the case with silicon or ceramics, then fuel cells on the same substrate can be connected in series or parallel.

The single or multiple fuel cells deposited on a single substrate part may be of any shape—square, rectangular, triangular, pentagonal, hexagonal, or similar shape, or circular or oval. This allows the regions between the fuel cells to be shaped as required, and/or to incorporate the required porosity. The dimensions of the fuel cells may vary across the surface of the substrate, as may the separation between them. The thickness of the three layers within each fuel cell may vary across the substrate to compensate for differing levels of fuel or oxidant availability. This may or may not involve a change in the overall thickness of the fuel cell(s).

The porosity and composition of the fuel cells on the substrate can also vary, to deal with differing levels of fuel and oxidant as they are consumed. Porosity in the fuel cells is important, not only in controlling the fluid flow rate, but also in determining the surface area for catalytic activity. The ceramic electrodes may provide all the required catalytic activity. Alternatively, a catalyst or catalysts may be deposited on the surfaces of the pores—still allowing access of gases to the pores. The catalyst or catalysts enhance the catalytic activity, or provide all of the electrode catalytic activity. The composition of each fuel cell on the substrate may vary. One reason for this is to provide different levels of catalytic activity in the electrodes as the fuel and oxidant are consumed. The compositional change may be in the main ceramic components and/or in the separate catalyst or catalysts deposited within the pores of the ceramic. The composition of the electrolyte may also change, for example to provide higher oxygen ion conductivity when the concentration of available oxygen decreases.

Having multiple fuel cells on a single metallic substrate has additional advantages:—
- it reduces overall distortion caused by differential thermal expansion in adjacent layers.
- if one region of electrolyte does fail, the crack will not propagate into adjacent areas
- it can provide a higher power density than a single large fuel cell. Temperature differentials build up during operation of a fuel cell, as a result of electrode reactions. The more electrical load the fuel cell is operating under, the higher these temperature differentials will be. The temperature gradient will vary across the fuel cell, and the differences in thermal expansion coefficient between the different fuel cell layers will result in stresses, which can lead to cracks forming in the fuel cell. If a single large fuel cell is used, then the cracks will propagate across the whole cell rendering it useless. If several small fuel cells are deposited on a substrate, then a fuel cell or fuel cells subject to the highest thermal gradient may fail, but this will not effect adjacent fuel cells. If a metallic substrate is used, its superior thermal conductivity helps to even out temperature differences between fuel cells, thus allowing multiple fuel cells to operate under a higher electrical load than a single fuel cell.

Fuel cell elements of the present invention can be stacked on top of each other, and clamped to provide positive contact between a substrate and the top electrode of the fuel cell(s) below. In the case of electrically conductive substrates it may be helpful to deposit insulating ceramic regions on the substrate to prevent adjacent substrates from short circuiting.

The porosity and composition of fuel cells within a stack may vary vertically as well as horizontally within the stack. Similarly, the thickness of the constituent layers of fuel cells may vary vertically as well as horizontally within the stack.

The discrete fuel cells may be formed on fuel cell elements according to the present invention by applying the electrode and electrolyte layers to a metal substrate by any of the means available to those experienced in the art. Examples of the techniques which might be used are listed below:—
traditional ceramic techniques such as screen printing, tape casting and spin casting, where the ceramic powder is mixed with other materials which burn off on heating to produce the desired properties;
electrochemical techniques such as electrophoretic deposition, where the ceramic powder is deposited from a colloidal suspension;
Physical Vapour Deposition (PVD), of which there are a number of techniques such as magnetron sputtering and evaporation;
Chemical Vapour Deposition (CVD), of which there are a number of different techniques;
thermal spraying of ceramic powder using techniques such as flame spraying and plasma spraying;
chemical methods where a precursor solution is coated using techniques such as spin coating and dip coating, and then heated to produce the required properties, this includes sol-gel methods; solutions may be sprayed onto the surface and then decomposed.

A combination of two or more of the above methods may be used, and in some cases multiple applications may be required to produce the correct thickness. A continuous sheet of ceramic can be converted to discrete regions by etching away the ceramic in between. The etching may be achieved by using a variety of techniques including photochemical etching, and plasma etching. Alternatively, the discrete regions of electrolyte can be deposited by a technique compatible with masking, which applies to several of those listed above. The electrode on top of the electrolyte can then be applied in a similar manner in order to avoid short circuiting.

Possible electrolyte materials are doped zirconia compounds, such as yttria stabilised zirconia (YSZ); doped ceria, such as $Ce0.9\ Gd0.1\ O1.95$ (CGO) and $Ce0.8\ Sm0.2\ O1.9$; bismuth oxide $Bi2O3$; tantalum pentoxide $Ta2\ O5$; and doped lanthanum gallates, such as $La0.8\ Sr\ 0.2\ Ga0.85\ Mg0.15\ O2.825$ (LSGM). The electrolyte may be rendered porous by standard deposition techniques.

Possible cathode materials include many perovskite materials which conduct both oxygen ions and electricity, and also catalyse the reduction reaction. Examples are $La0.7\ Sr0.3\ Mn\ O3\text{-delta}$ (LSM), $La0.6\ Sr0.4\ Cu0.2\ Fe0.8\ O3\text{-delta}$, $Ba0.5\ Sr0.5\ Cu0.8\ Fe0.2\ O\ 3\text{-delta}$, $La0.5\ Sr0.5\ Co\ O3\text{-delta}$, $Sm0.5\ Sr0.5\ Co\ O3\text{-delta}$, $Gd0.6\ Sr0.4\ Co\ O3\text{-delta}$. These may be mixed with the relevant electrolyte material which have already been listed. The perovskite may also be mixed with a suitable metallic material such as platinum, silver, gold, titanium, tungsten, lanthanum, strontium, cobalt, iron, magnesium or chromium.

Many anodes are cermets, which are a mixture of the electrolyte material (listed above) and a suitable metal, such as nickel, copper, silver, gold, palladium, cobalt, ruthenium, platinum, or powders made from a nickel alloy or cupronickel alloy. Another possible anode is a perovskite material which conducts electrons and oxide ions and also catalyses the oxidation reaction, such as $La0.8\ Sr0.2\ Cr0.8\ Mn0.2\ O3\text{-delta}$. Patent GB Pat. No. 2394114 suggests that an oxide with $Zn^{2+}$, $In^{3+}$, $Ga^{3+}$, or $Sn^{4+}$ would be suitable.

In fuel cell elements according to the present invention the cathode and anode layers may be present in any order, i.e either the cathode or the anode may be in contact with the supporting substrate.

Embodiments of the invention will now be described by way of example with reference to the accompanying drawings in which.

Figure 1:
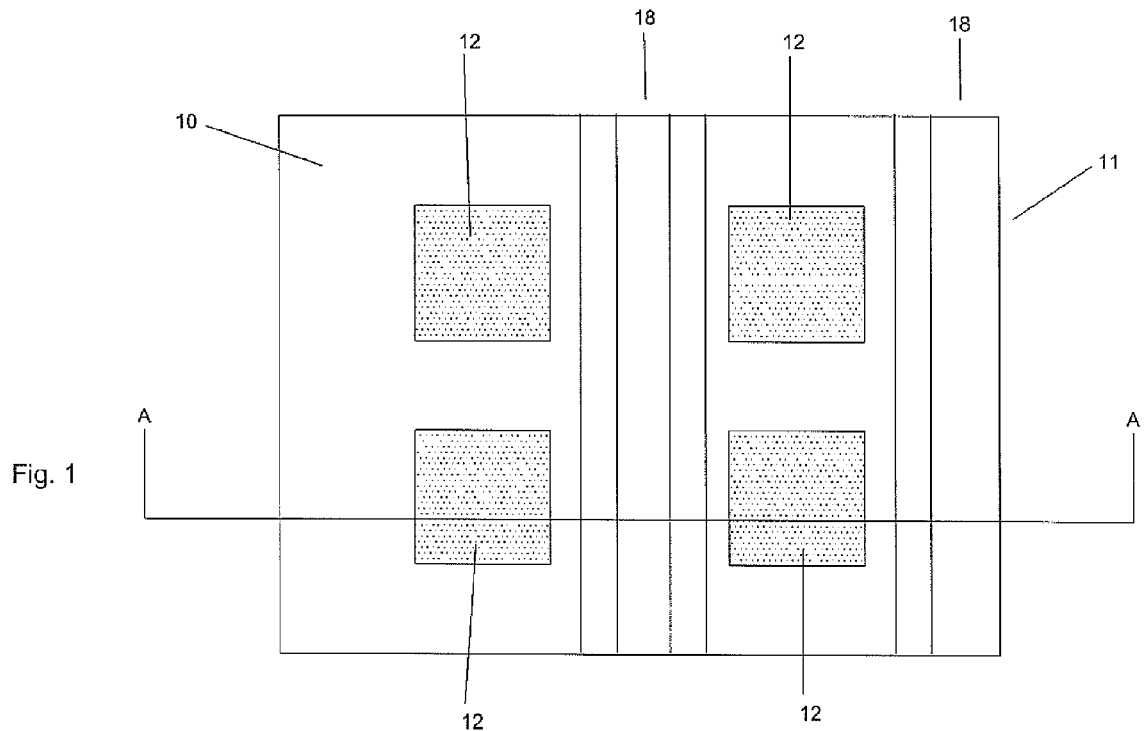
FIG. 1 is a plan view of a fuel cell element according to the present invention.

Referring to FIG. 1, this shows a fuel cell element 11 comprising a metallic substrate 10, on which are deposited four fuel cells 12. The substrate is Nimonic 75 (a nickel alloy) which has a thickness of 75 μm. The fuel cells each comprise a first electrode material comprising an Sm0.5 Sr0.5Co O3-delta cathode, a second electrode material comprising a nickel and CGO cerment anode and an intervening electrolyte material comprising Ce0.9 Gd0.1 O1.95(CGO). The electrode materials may be arranged either so that the anode material is above the electrolyte and the cathode material is below it with respect to the substrate, or so that the cathode material is above the electrolyte and the anode material is below it.

There are two straight, parallel channels 18, in the metal substrate and between the fuel cells. Alternatively, these channels may be non-linear and parallel. Channels may be formed in two or more directions of any angle, of the same or different depths. The cross-section of these channels may be triangular, square, rectangular, trapezoidal, semicircular, or any other suitable shape. Alternatively, shaping of the substrate may be in the form of depressions, and/or extensions, producing an 'egg-carton' shape—these indentations may have points at the end, or circles, rectangles, squares, triangles, or other suitable shape. The extensions and depressions may be of the same or different sizes and shapes. These indentations may also be in the bottom of shaped channels. The shaping may be between, across or around the fuel cells. This has the advantage of allowing flow in any direction above and below the substrate.

Shaping may take the form of machined, milled or etched grooves in the substrate.

Successive fuel cell elements may have different substrate shapes. This allows pressure to be applied at the correct points when the elements are stacked and then mechanically loaded.

The fuel cells are shown as being identical in size and shape, however, this may change over the area of the substrate in order to accommodate different shaping or porosity of the substrate, and a decrease in the amount of fuel and/or oxidant available as it is consumed. The thickness of each fuel cell or the components thereof may also change across the area, this is particularly relevant to the electrodes, again to compensate for different levels of fuel and/or oxidant.

The substrate is shown as being square, but it may be rectangular, triangular, hexagonal, trapezoidal, circular, oval, or any other suitable shape. It may also be made up of more than one part, at least one of which will have a single or multiple fuel cells thereon. Multiple parts may be joined together by techniques stated above.

The above observations regarding the size, shape and composition of the substrate, and the fuel cells deposited on it apply to all of the following figures, unless otherwise specified.

Figure 2:
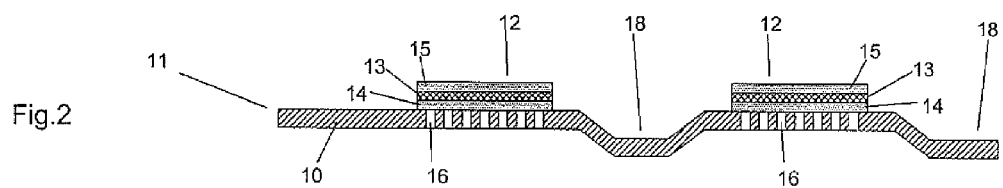
FIG. 2 is a sectional view on the line A-A of FIG. 1.

FIG. 2 shows a section A-A of FIG. 1. Each of the cells 12 has an electrolyte layer 13 between a first electrode layer 14 and a second electrode layer 15. The electrolyte may be gas tight or porous, as long as it prevents the two electrodes on each side from short-circuiting. The three layers 13, 14, 15 are deposited in succession onto the metal substrate 10, prior to holes 16 being produced in the metal substrate beneath the first electrode layer 14. The holes 16 are approximately 40 µm in diameter. The regions of the substrate 10 occupied by the cells 12 is thus porous. In this embodiment, there are four such porous regions in the substrate 10: in other embodiments, there are larger numbers of regions, with no upper limit. The holes 16 may be produced by techniques such as photochemical etching, or mechanical or laser drilling. Alternatively, the same result may be achieved starting with a solid metal substrate, producing multiple porous regions, and then depositing the first electrode, electrolyte and second electrode layers onto the porous regions. In this case the first electrode may penetrate into the pores. Optionally, an interface layer may be deposited between the electrolyte layer 13 and either or both electrode layers 14, 15. The substrate can be shaped between, across and around the fuel cells. The figure shows channels 18. When the cells are stacked they allow turbulent flow of fluids to and from the fuel cells. The only porous regions are beneath the fuel cell(s). In this case the electrolyte layers 13 do not completely seal the pores 16, because of the intervening porous electrodes 14.

Successive fuel cell elements of the invention are shown in FIGS. 3 to 14. The features of the successive fuel cell elements corresponding to features of the first fuel cell element 11 are indicated by the corresponding reference numerals but increased by multiples of 10 for each successive fuel cell element, unless otherwise stated.

Figure 3:
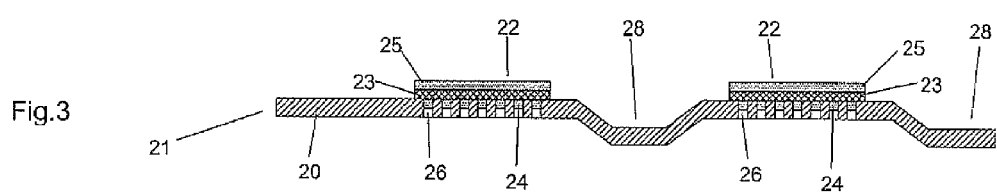
FIG. 3 is a view corresponding to FIG. 2 of a second fuel cell element of the present invention.

FIG. 3 shows two fuel cells 22 of a second fuel cell element 21 comprising a substrate 20. Each cell 22 has an electrolyte layer 23, a second electrode layer 25 on top of the electrolyte layer 23, and a first electrode layer 24 within the pores 26 in the metal substrate 20. The number of individual cells can be as mentioned above. Again, the pores 26 may be produced in the substrate 20 before or after the electrolyte and second electrode layers 23 and 25 are deposited. Optionally, an interface layer (not shown) may be deposited between the electrolyte layer 23 and either or both of the electrode layers 24 and 25. For example, the interface layer could be deposited first onto the metal substrate, followed by the electrolyte layer 23, another interface layer, and then the second electrode layer 25. After producing the pores 26 within the metal substrate opposite the electrolyte, the first electrode layer 24 could be deposited within the pores. An alternative method of producing the same effect is to make the pores 26 within the substrate 20, to deposit the first electrode layer 24 within the pores, followed by the interface layer, the electrolyte layer 23, another interface layer and second electrode layer 25 on top. The only porous regions are beneath the fuel cell(s). The figure shows channels 28. In this case the electrolyte layers 23 are porous. The porous electrolyte may be produced by mixing CGO powder with a binder, such as terpineol, and screen printing this mixture onto the substrate. The substrate is then heated to approximately 900° C. to burn off the binder and provide partial sintering of the powder. This allows the fuel and oxidant to flow through each fuel cell, from one side of the substrate to the other.

The size and shape of the pores below the fuel cells are designed to allow the flow of fluid to and from the bottom electrode of the fuel cell. Porous regions which are not covered by fuel cells will usually be larger to allow the flow of fluids through the substrate, and to provide good electrical contact with the top electrode of the fuel cell below. Holes in the substrate may be any shape, for example circular, oval, square, rectangular, triangular, or hexagonal, or irregular shape such as a crescent. The holes may be completely open or be in the form of a pressed slit where a flap of material is still in contact with the substrate.

Figure 4:
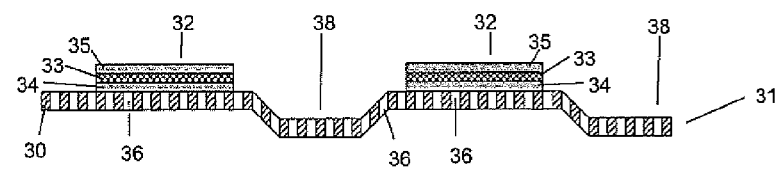
FIGS. 4 and 5 are views corresponding to FIG. 2 of respectively, third and fourth fuel cell elements of the present invention.
Figure 5:
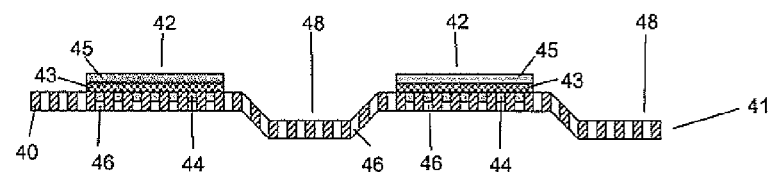

FIGS. 4 and 5 show views corresponding to FIGS. 2 and 3, respectively, of third and fourth fuel cell elements 31 and 41 of the present invention in which, rather than being formed with separate porous regions, the respective substrates 30 and 40 are porous over their entire surfaces. Alternatively, the substrates may have porous regions adjacent to the fuel cells, but retain non-porous regions, for example to facilitate joining around the periphery of the substrate. Each feature of the third and fourth fuel cell elements 31 and 41 corresponding to the second fuel cell element 21 of FIG. 3 are indicated by reference numerals increased by 10 and 20, respectively.

The respective substrates 30 and 40 may be made and shaped by the techniques described above. The holes can be produced by such techniques as photochemical etching, laser or mechanical drilling, or other suitable techniques. Alternatively, the substrates may be formed from woven metal mesh, or a combination of metal meshes of different aperture sizes, as disclosed in WO-A-02/101859. In another alternative, the substrates may be mainly porous, such as is provided by expanded metal as stated in GB-A-2400723, which has non-porous regions down each edge. In contrast to the fuel cells disclosed in WO02/101859 the electrolyte does not cover the entire porous area, and does not need to seal with non-porous regions, because the fluids are similar on both sides of the metal substrate.

Figure 6:
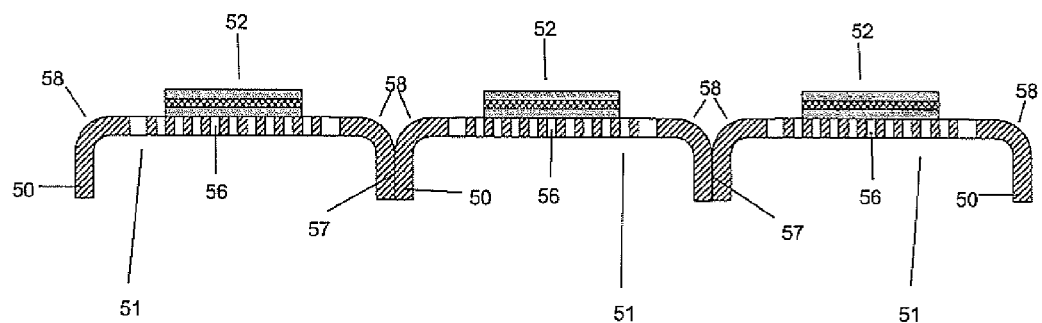
FIG. 6 is a sectional view of an array of fifth fuel cell elements of the present invention.

FIG. 6 shows an array of fifth fuel cell elements 51 according to the present invention. In this case, each substrate part 50 has a single fuel cell 52, similar to those shown in FIG. 4, and the ends are solid and bent round at right angles 58. The porous region 56 extends beyond the fuel cells to allow fuel and oxidant to flow through the substrate. Individual elements 51 may then be joined along the edges 57 of the substrates 50 to form a planar array. Each element 51 may support more than one fuel cell. The substrate 50 may be entirely porous, and the edges may have multiple bends at any angle. Further fuel cell elements 51 can be stacked to achieve the required voltage. Each element 51, may or may not be electrically connected to each adjacent element.

Figure 7:
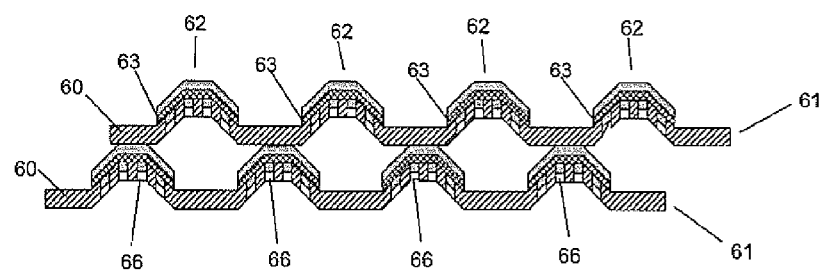
FIG. 7 is a sectional view of a stack of two sixth fuel cell elements of the present invention.

FIG. 7 shows a stack of sixth fuel cell elements 61 of the present invention. Fuel cells 62 are deposited on shaped sections of the substrate 60. The shaped section is porous 66. The electrolyte regions 63 are porous to allow fluids to flow through. The fuel cell elements 61 are stacked such that the substrate 60 of one element 61 is in contact with the uppermost electrode(s) 62 of an adjacent element 61 such that they are connected in electrical series. Further fuel cell elements 61 can be stacked to achieve the required voltage. The substrate regions between the fuel cells are shown as solid, but they may be optionally porous.

Figure 8:
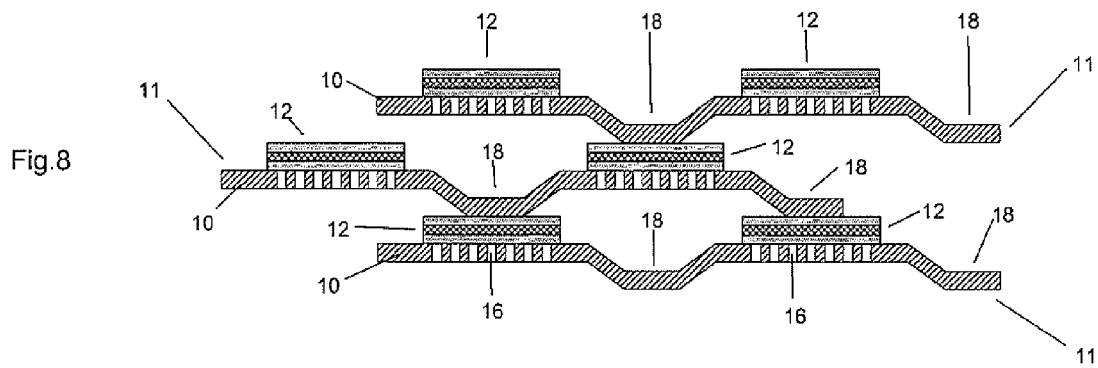
FIG. 8 is a sectional view of a stack of three first fuel cell elements of the present invention as shown in FIG. 2.

FIG. 8 shows a stack of three first fuel cell elements 11, as shown in FIG. 2, in which the substrates 10 are solid but have multiple cell regions 12, each of which has a porous region 16 associated with it. The fuel cell elements 11 are stacked such that the substrate 10 of one element 11 is in contact with the uppermost electrode(s) of fuel cells 12 of an adjacent element 11 such that they are connected in electrical series. Further fuel cell elements 11 can be stacked to achieve the required voltage.

Figure 9:
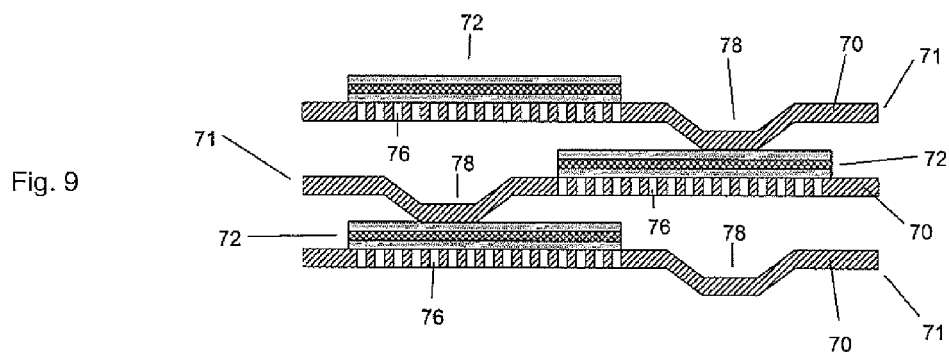
FIG. 9 is a sectional view of a stack of three single seventh fuel cell elements of the present invention.

FIG. 9 shows a stack of three seventh fuel cell elements 71, and is similar to FIG. 8, except that each fuel cell element only has a single fuel cell 72 deposited on it. Each substrate 70 is shaped at 78 and the porous regions 76 are below the fuel cells. The porous electrodes of fuel cells 72 allow fluids to flow from one side of the substrate to the other. The fuel cell elements 71 are stacked such that the substrate 70 of one element 71 is in contact with the uppermost electrode of fuel cell 72 of an adjacent element 71 such that they are connected in electrical series. The substrate region adjacent to the fuel cell is shown as solid, but it may be porous. Further fuel cell elements 71 can be stacked to achieve the required voltage.

Figure 10:
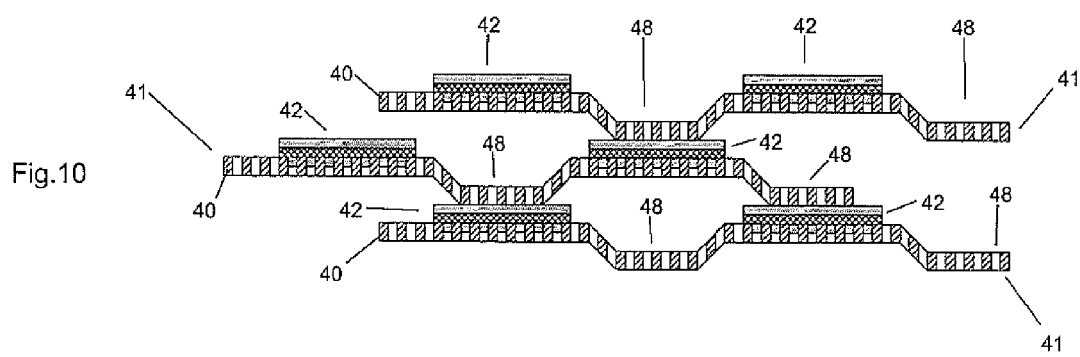
FIG. 10 is a sectional view of a stack of three fourth fuel cell elements of the present invention as shown in FIG. 5.

FIG. 10 shows a stack of three fourth fuel cell elements 41 as shown in FIG. 5, in which the metal substrates 40 are entirely porous. There are multiple fuel cells 42 on each substrate, but this concept would also function with a single fuel cell on each. The cells 42 are connected in series with adjacent elements. No interconnects are required, and the substrates 40 allow fluids to enter and leave both the electrodes, and flow through the substrates.

Figure 11:
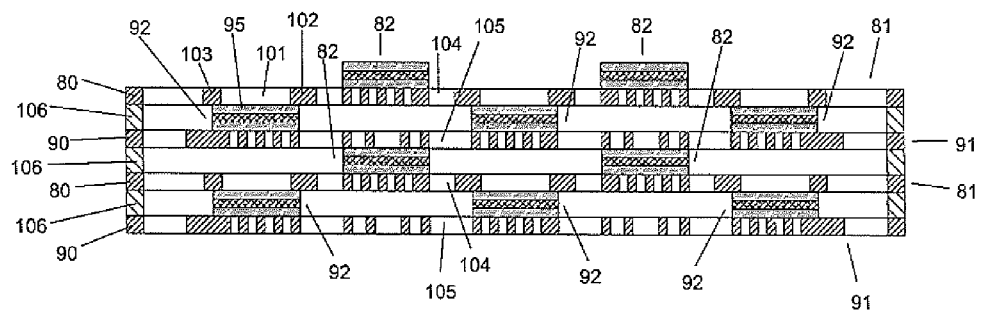
FIG. 11 is a sectional view of a stack of eighth and ninth fuel cell elements of the present invention.

FIG. 11 shows a stack of four fuel cell elements, consisting of two different substrate configurations, comprising eighth and ninth fuel cell elements 81 and 91 of the invention respectively, each of which is planar. Substrate 80 shows two fuel cells 82, and substrate 90 shows three fuel cells 92 in this section. Porosity is chosen to allow fluid access to each electrode of each fuel cell, but also to provide positive electrical contact. The uppermost electrode 95 of substrate 90 is provided with fuel through the hole 101 in the substrate 80 above; and electrical contact is established by the solid regions 102 and 103 in the substrate 80. The region 101 may be populated with many small pores rather than one large one, in order to increase the contact area between the substrate 80 and the fuel cell below. Vertical fluid flow is possible by routes such as 104 and 105 within the stack. There are either discrete or continuous deposits of ceramic 106 on the substrate. One function of the ceramic 106 is to prevent adjacent electrically conducting substrates touching, as they can be very close, particularly in this configuration. Another function is to provide positive contact between a substrate and the fuel cell(s) that it is in contact with, when the fuel cell elements are stacked and mechanically clamped together. The ceramic may be the same material as the electrolyte, or other such as alumina. The thickness of the ceramic insulators would normally be the same as the fuel cells protruding from the substrate, but may be less or more. Further alternating fuel cell elements 81 and 91 can be stacked to achieve the required voltage. The substrate is shown as planar, but it may be shaped.

The composition and porosity of the fuel cells may vary horizontally and vertically within the stack. For example, a platinum/rhodium catalyst is used in the catalytic oxidation of ammonia to form nitric oxide (and ultimately nitric acid). If air and ammonia are fed into the base of the stack, then anodes in the fuel cells at the base of the stack would need a low catalytic load to minimise direct reaction between oxygen and ammonia. However, as the gases move further up the stack, a progressively higher loading of catalyst would be required to convert the lower concentration of reactants. A higher surface area could be provided by increasing the degree of porosity, decreasing the pore size, and increasing the thickness of the electrode(s). Oxygen ion transport through the electrolyte could also be increased as oxygen concentrations decrease, either by decreasing the electrolyte thickness, or by changing the composition of the electrolyte, or both. Porosity of the electrolyte may also vary to modify flow through the stack.

Figure 12:
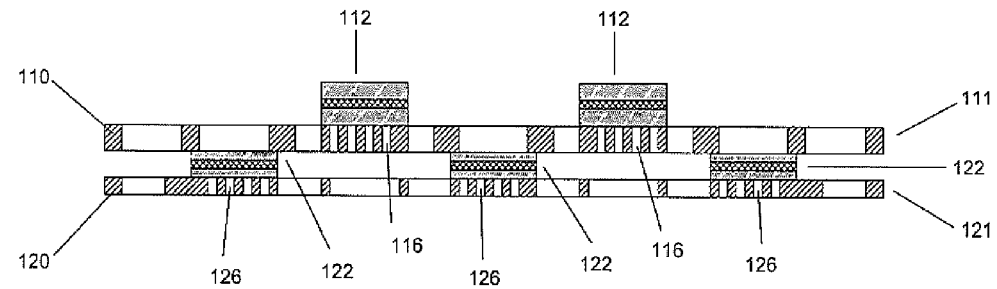
FIG. 12 is a sectional view of a stack of tenth and eleventh fuel cell elements of the present invention.

FIG. 12 shows a stack of two fuel cell elements 111 and 121 comprising tenth and eleventh fuel cell elements of the invention respectively. Tenth fuel cell element 111 comprises a substrate 110 with multiple porous regions such as 116, on which are deposited two fuel cells 112. Eleventh fuel cell element 121 comprises a substrate 120 with multiple porous regions such as 126, on which are deposited three fuel cells 122. In this case the thickness of the substrate 110 is greater than that of substrate 120. A thicker substrate may be required if the reactions are exothermic and the temperature increases as the fluids travel through the stack. The temperature variations may also require a change in substrate composition, to provide the required strength and corrosion resistance. Porosity varies across each of the substrates. The porosity of substrate 110 differs from that of 120 in order to provide fluid flow passages through the stack. The thickness of the electrodes in fuel cells 112 is greater than that in fuel cells 122. Thicker electrodes can provide a greater area of catalytic activity to compensate for lower reactant concentrations. The porosity and composition of the electrodes may vary, as explained above. The substrates are shown as planar, but they may be shaped. The thickness, porosity and composition of the electrolyte may also change through the stack.

Figure 13:
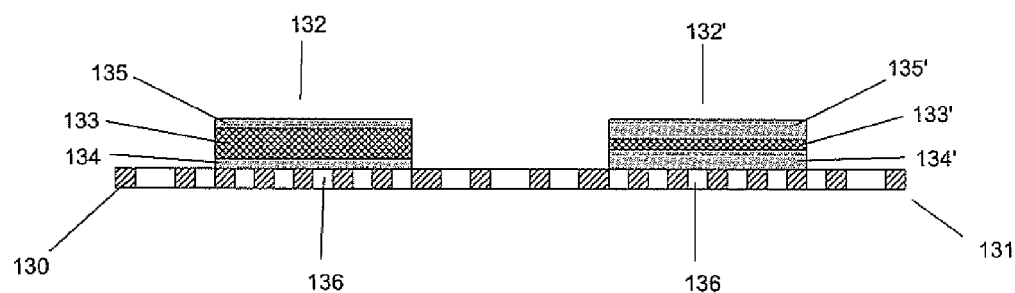
FIG. 13 is a sectional view of a twelfth fuel cell element of the present invention.

FIG. 13 shows a twelfth fuel cell element of the invention 131 comprising two fuel cells 132 and 132' deposited on a substrate 130. Each fuel cell has an electrolyte 133,133', an upper electrode 135,135', and a lower electrode 134,134'. In this case the electrode 134' is thicker than electrode 134, the electrode 135' is thicker than electrode 135, and the electrolyte 133' is thinner than electrolyte 133. The net result is that the fuel cell 132' has potentially higher catalytic activity than fuel cell 132 because the electrodes are thicker, but the overall height of the two fuel cells is the same. This makes stacking of planar substrates more straightforward. Another way of achieving the same result is if some or all of the lower electrodes 134,134' penetrate into the pores 136, so that the total height of the fuel cell element stays the same.

Figure 14:
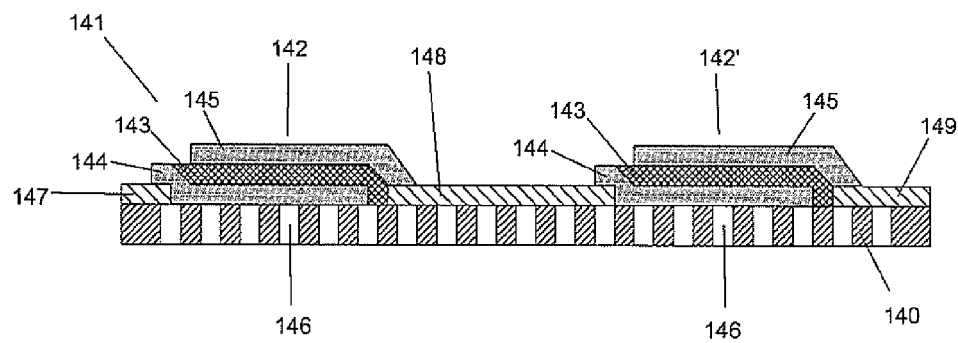
FIG. 14 is a sectional view of a thirteenth fuel cell element of the present invention.

FIG. 14 shows a thirteenth fuel cell element 141 of the invention comprising a porous non-electrically conducting substrate (comprising porous alumina of 2 mm thickness) 140, on which are deposited first and second fuel cells 142, 142' which are connected in series. Each fuel cell 142,142' consists of a first electrode 144, and a second electrode 145 separated by electrolyte 143. The substrate 140 comprises pores 146 having diameters of approximately 20 μm. The regions 147, 148, 149 between the fuel cells 142, 142' are electrically conducting, and they may be the same material as the electrodes 144 or 145, or a different metallic conductor, such as copper, silver, nickel, cobalt, iron, gold, platinum, palladium, rhodium, iridium, titanium, zirconium, tantalum, molybdenum, tungsten, or alloys of the above, particularly nickel alloys, cobalt alloys and stainless steels. The second electrode 145 of the first fuel cell 142 is connected to the first electrode 144 of the second fuel cell 142' via a conductor 148. Therefore the two cells 142, 142' are connected in series. On such an insulating substrate 140, fuel cells can be connected in series, or parallel, or both. Cells can be deposited on both sides of the substrate 140, which can be planar or shaped; or tubular with a circular, oval or a regular or irregular polygon cross-section. The electrically insulating substrate 140 may alternatively be produced from a metallic substrate by coating, or by treating the surface. One example would be anodised stainless steel. These substrates 140 may be connected in series and/or parallel with adjacent substrates 140 to form an array of fuel cell elements 141. Electrical conduction between fuel cell elements 141 may be achieved by depositing conducting material onto the substrates 140 to allow them to be stacked and to be in electrical contact. Alternatively, electrical contact may be achieved by use of an external conductor which connects two or more elements.

The fuel cell element shown in FIG. 14 has a substrate 140, which is entirely covered either by fuel cells or connecting material—this will be referred to as a strip of fuel cells. The substrate may have just one strip of fuel cells deposited on it, and it may also have regions on one or both sides of the fuel cell strip which have no coating—these regions allow fluids to readily pass through. Alternatively, the substrate may have more than one strip of fuel cells deposited on it. These strips may be connected to each other in series and/or in parallel, or only connected to strips on adjacent substrates.

Electrically conducting substrates may be tubular, with a circular, oval or a regular or irregular polygon cross-section. In the case of the latter, fuel cells may be deposited on more than one face, and adjacent tubes may be connected in series and/or parallel with each other.

The insulating ceramic deposits on the substrate may be incorporated on the substrates of any of the electrically conducting fuel cell elements listed above.

Each of the metallic substrates listed above may have slits pressed into them, to assist in fluid flow and to increase turbulence in the fluid flow.

The fuel and oxidant may enter at any angle to the stack:—top, bottom, horizontal, or a combination of these. Fuel and oxidant may be mixed before entering the stack, or they may be mixed within the stack.

Layers may be placed between fuel cell elements to assist with fluid flow or electrical contact between adjacent layers, for example porous metal structures such as nickel felt or corrugated expanded foil. Substrates may be coated to assist with corrosion resistance, provide catalytic properties, or to improve electrical contact with adjacent layers.

The invention claimed is:

1. A fuel cell element comprising:
a substrate; and
at least one fuel cell positioned on said substrate, said fuel cell not entirely covering said substrate, said fuel cells comprising:
a solid state non-polymeric first electrode layer;
a solid state non-polymeric second electrode layer; and
a solid state non-polymeric electrolyte layer positioned between said first electrode layer and said second electrode layer, the fuel cell suitable for receiving fuel and oxidant supplied to said first and second electrode layers, said substrate having at least one porous regions, the fuel cell being supported by said at least one porous region of said substrate, at least a portion of said at least one porous region not being sealed by said electrolyte layer, the porous region which is not entirely covered by said at least one fuel cell allowing the fuel and oxidant to flow through said substrate.

2. The fuel cell element of claim 1, said electrolyte layer being porous.

3. The fuel cell element of claim 1, said electrolyte layer not contacting said substrate.

4. The fuel cell element of claim 1, said substrate being entirely porous.

5. The fuel cell element of claim 1, said substrate being shaped to form at least one gas or liquid flow pathway.

6. The fuel cell element of claim 1, said at least one fuel cell comprising at least two fuel cells, said substrate being non-electrically conductive, said at least two fuel cells being connected by deposited electrically conductive materials.

7. The fuel cell element of claim 1, said substrate being metallic, said at least one fuel cell comprising an insulated ceramic deposit.

8. The fuel cell element of claim 1, said at least one fuel cell comprising at least two fuel cells, one of a composition and a thickness and a porosity of at least one of the first and second electrode layers and the electrolyte layer of one of the fuel cells differs from a composition and a thickness and a porosity of at least one of the first and second electrode layers and the electrolyte layer of another of the fuel cells.

9. The fuel cell element of claim 1, said substrate having a planar portion on which said at least one fuel cell is located, said substrate having an edge portion that lies partly or entirely outside a plane of said planar portion.

10. The fuel cell element of claim 1, said substrate being tubular.

11. An array of fuel cell elements in which each fuel cell is defined by claim 1.

12. A stack of at least two fuel cell elements in which each fuel cell element is defined by claim 1.

13. The stack of at least two fuel cell elements of claim 12, one of a composition and a thickness and a porosity of at least one of said first and second electrode layers and the electrolyte layer of one of the fuel cells of at least one of the fuel cell elements differs from a composition and a thickness and a porosity of at least one of the first and second electrodes and the electrolyte layers of one fuel cell of another of the fuel cell elements.

14. The stack of at least two fuel cell elements of claim 12, one of a composition and a thickness and a porosity of the substrate of one of the fuel cell elements differs from a composition and a thickness and a porosity of the substrate of another of the elements.

15. A stack of at least two arrays of fuel cell elements in which each array is defined by claim 11.

* * * * *